United States Patent [19]

Davies et al.

[11] Patent Number: 4,579,147
[45] Date of Patent: Apr. 1, 1986

[54] OUTLET VALVE FOR PRESSURIZED DIVING SUIT

[75] Inventors: Frank J. Davies, Lacey; Bart G. Eggen, Olympia, both of Wash.

[73] Assignee: Paul H. Gunderson, Scappoose, Oreg.

[21] Appl. No.: 676,668

[22] Filed: Nov. 30, 1984

[51] Int. Cl.⁴ ............................................. F16K 15/14
[52] U.S. Cl. ..................... 137/854; 251/331; 251/82
[58] Field of Search .................. 137/854, 843; 128/204.26, 205.24, 201.27, 201.28, 202.11, 1 A, 206.22; 2/2.1 A, 2.1 R; 251/339, 82, 319, 83

[56] References Cited

U.S. PATENT DOCUMENTS

| 161,002 | 3/1975 | Brown . |
| 1,162,416 | 11/1915 | Teter . |
| 1,385,058 | 7/1921 | Warter . |
| 2,322,521 | 6/1943 | Jenkins . |
| 2,404,020 | 7/1946 | Akerman . |
| 2,417,177 | 3/1947 | Richou . |
| 2,548,374 | 4/1951 | Janson . |
| 2,593,988 | 4/1952 | Cousteau . |
| 2,663,122 | 12/1953 | Cornelius . |
| 2,707,966 | 5/1955 | Taplin . |
| 2,887,123 | 5/1959 | Becker . |
| 3,024,465 | 3/1962 | Bould . |
| 3,042,926 | 7/1962 | Shephard ............................ 2/2.2 R |
| 3,342,200 | 9/1967 | Wilcox ................................ 137/102 |
| 3,385,301 | 5/1968 | Harautuneian ................. 137/843 X |
| 3,393,702 | 7/1968 | Ferrill . |
| 3,435,839 | 4/1969 | Elder ........................... 128/205.24 X |
| 3,473,849 | 10/1969 | Smith et al. . |
| 3,474,783 | 10/1969 | Ulmann ........................... 137/529 X |
| 3,610,273 | 10/1971 | Russell . |
| 3,636,966 | 1/1972 | Aldrich et al. . |
| 3,968,795 | 7/1976 | O'Neill et al. . |
| 3,973,588 | 8/1976 | Holst ........................... 128/201.28 X |
| 4,037,594 | 7/1977 | Riegel et al. . |
| 4,229,832 | 10/1980 | Dickson, Sr. .................... 137/854 X |
| 4,276,877 | 7/1981 | Gdulla . |
| 4,354,520 | 10/1982 | Easley, Jr. . |
| 4,428,392 | 1/1984 | Jones et al. ..................... 137/854 X |

FOREIGN PATENT DOCUMENTS 1092737 4/1955 France .
840559 7/1960 United Kingdom .

Primary Examiner—Samuel Scott
Assistant Examiner—Carl D. Price
Attorney, Agent, or Firm—Klarquist, Sparkman, Campbell, Leigh & Whinston

[57] ABSTRACT

An exhaust valve for a diving suit includes a valve seating disc having a concave annular valve seat sealing surface adjacent its rim, and a flexible diaphragm sealingly disposed adjacent the sealing surface. An axially resilient sleeve is attached at its ends to the inlet portion of the housing and the seating disc. Axial compression of the sleeve moves the disc and diaphragm away from a normally contacting annular rim in the housing to permit air under pressure to exit the diving suit and flow radially between the sealing rim portion of the diaphragm and the sealing surface of the disc, then to exit the valve.

8 Claims, 5 Drawing Figures

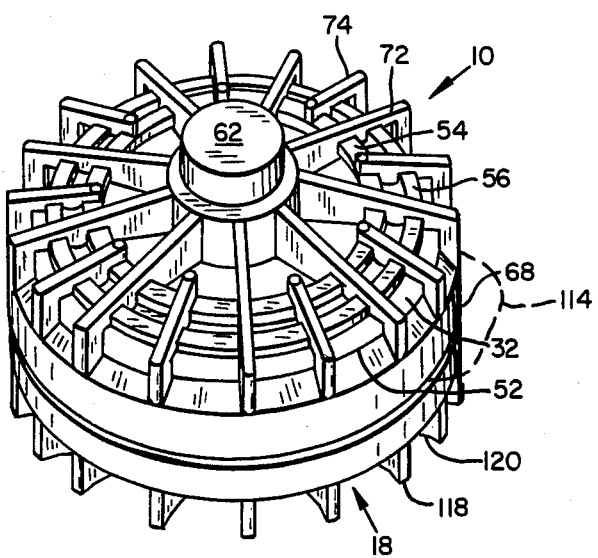
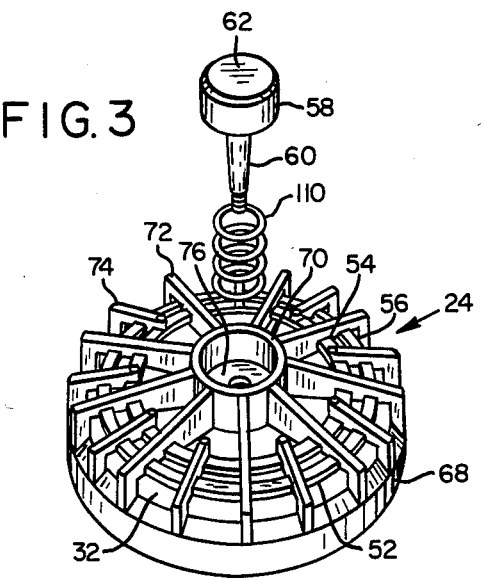
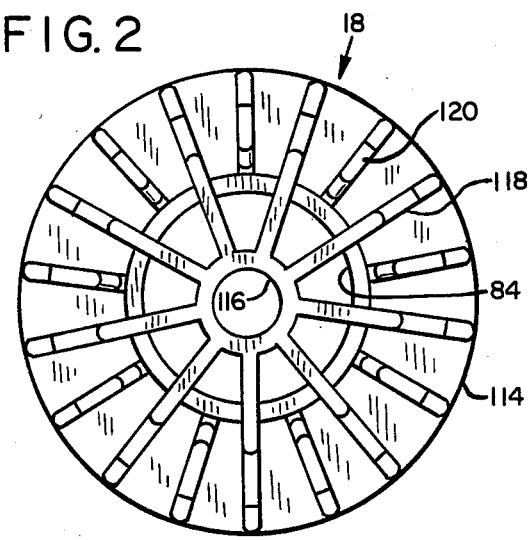
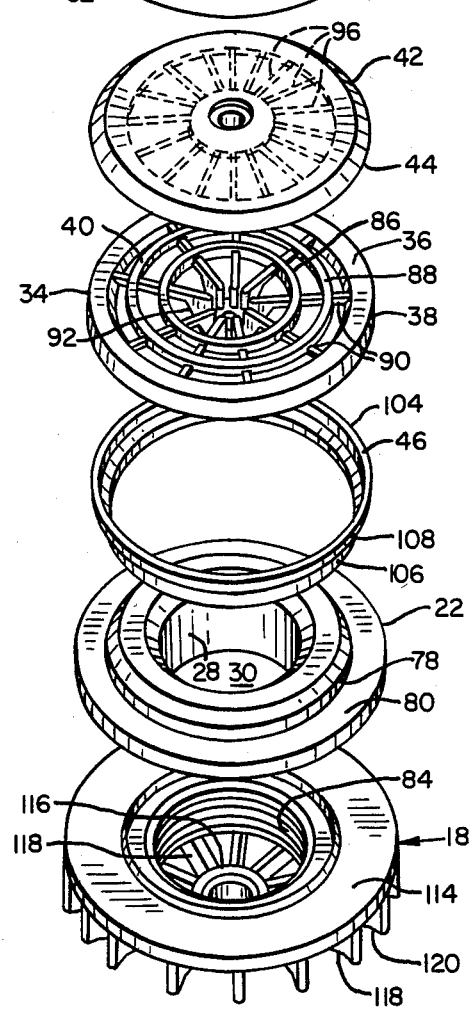

OUTLET VALVE FOR PRESSURIZED DIVING SUIT

BACKGROUND OF THE INVENTION

This invention relates to valves used with diving suits and more particularly, to an improved valve for controlling the release of excess quantities of air from within a diving suit.

Diving suits of the type known as "dry suits" are effective in conserving body heat especially in extremely cold water conditions. The dry suit is a relatively loose fitting, watertight suit, adapted to be worn over relatively heavy, thermally protective insulating underwear. An example of a dry suit is shown in Spangrud, et al. U.S. Pat. No. 4,483,019.

Exhaust valves for dry diving suits have as their primary purpose that of controlling the release of excess air during ascent of a diver. Typically, the diver vents excess air by depressing an exhaust valve actuator to relieve the force of an internal spring sufficiently to permit the valve to be opened by the excess pressure of the internally trapped air. As long as the diver holds the actuator depressed, the excess air escapes until the internal air pressure is reduced to that of the ambient water pressure, at which point the valve prevents water from entering the suit.

It is important that an exhaust valve quickly allow full release of excess air notwithstanding minimal pressure differential between the interior and exterior of the suit. Presently available valves do not achieve this purpose satisfactorily.

It is thus an object of the present invention to provide an exhaust valve for use with dry diving suits that will exhaust air quickly even under minimum pressure.

It is a further object of the present invention to provide a valve of this type that can function safely under the various conditions experienced by the diver.

A still further object of the present invention is to provide an exhaust valve of the above type that is simple and economical to construct.

DESCRIPTION OF THE DRAWINGS

FIG. 1 is a perspective view of the exhaust valve of the present invention;

FIG. 2 is a bottom view of the valve;

FIG. 3 is an exploded perspective view of the valve;

DESCRIPTION OF THE PREFERRED EMBODIMENT

Figure 4:
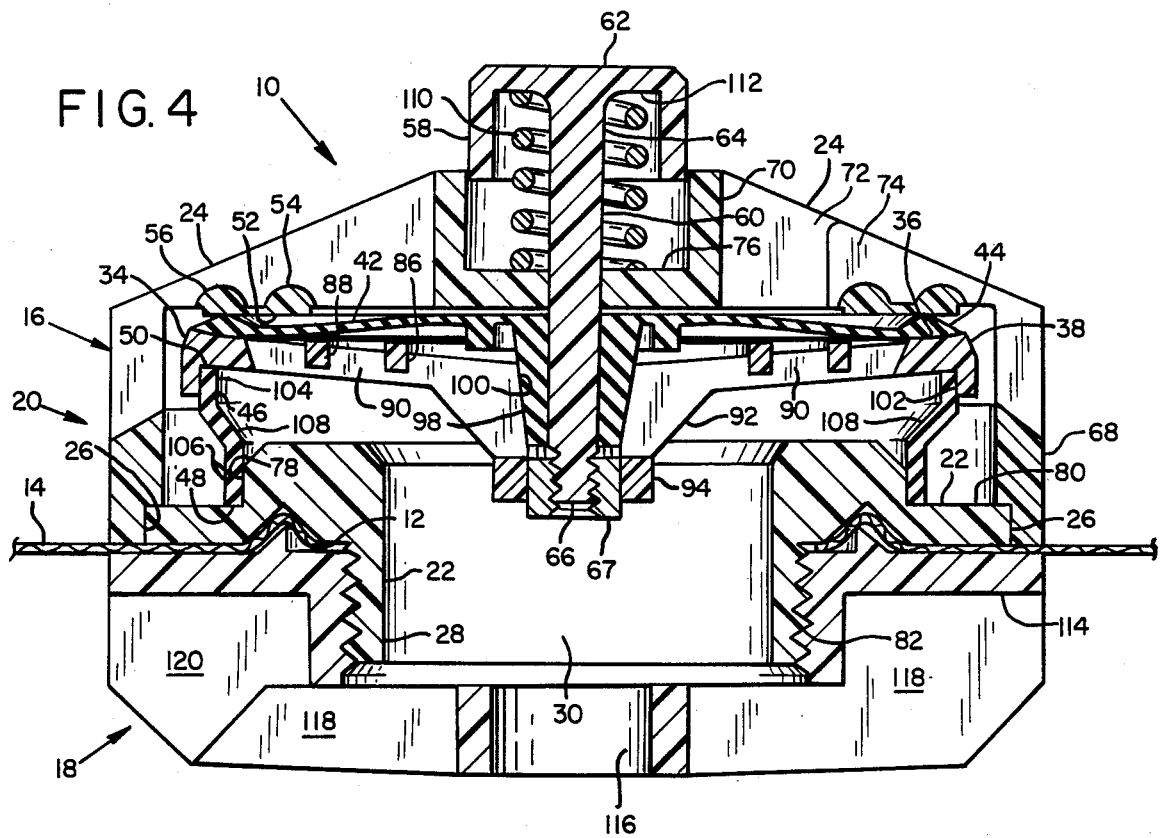
FIG. 4 is an enlarged sectional view of the valve in its closed position.

Referring to the drawings the valve 10 of the present invention is adapted to be secured in an aperture 12 disposed in the fabric 14 of a diving suit (not shown). As such, the valve 10 includes a portion 16 disposed exteriorly of the diving suit and another portion 18 disposed interiorly of the diving suit, for example, adjacent the user's upper arm. The fabric 14 of the suit is sandwiched between portions 16 and 18.

The exterior portion 16 of the valve 10 comprises a housing 20 having an inlet portion 22 which makes an interference fit with and is cemented to an outlet portion 24 along a surface 26. Inlet portion 22 includes a circular opening 28 which serves as an inlet 30 to permit air from the interior of the suit to enter the valve. Outlet portion 24 is generally of ribbed construction as shown, thereby to provide a plurality of outlets 32 for egress of air as will hereinafter be made more fully apparent.

A valve seating manifold or disc 34 is disposed interiorly of the housing 20 intermediate inlet portion 22 and outlet portion 24. Disc 34 has an annular valve seat sealing surface 36 adjacent its rim 38, sealing surface 36 being disposed on side 40 of disc 34 which is adjacent outlet portion 24.

A flexible diaphragm 42 is provided with an annular valve seat engaging sealing rim portion 44. Diaphragm 42 is secured to disc 34 with sealing rim portion 44 disposed adjacent sealing surface 36 of disc 34.

An axially resilient sleeve 46 is attached at its ends 48, 50 to inlet portion 22 and disc 34, respectively. Sleeve 46 is attached to disc 34 generally peripherally adjacent rim 38. Sleeve 46 is adapted to be compressed under pressure applied to disc 34 as will be made more fully clear hereinafter.

Outlet portion 24 includes annular contacting means comprising a circumferentially extending flat annular rib 52 reinforced with annular ribs 54, 56 of semi-circular cross-section. Rib 52 is adapted to contact sealing rim portion 44 of diaphragm 42 to urge portion 44 sealingly into engagement with sealing surface 36 of disc 34.

An actuation member 58 having a shaft portion 60 extends axially through housing 20. A manually engageable exterior portion comprising a plunger 62 is mounted on the outer end 64 of shaft 60. The inner end 66 of shaft 60 is threadedly attached centrally to disc 34 by means of an internally theaded brass sleeve 67. Movement of plunger 62 thus serves to compress sleeve 46 to move disc 34 away from rib 52, whereby air under pressure can flow from the interior of the suit, radially between sealing rim portion 44 of diaphragm 42 and sealing surface 36 of disc 34, thereby to egress the valve.

Considering the individual components of valve 10 more specifically, outlet portion 24 comprises an annular ring 68 which circumscribes and forms the interference fit at surface 26 with inlet portion 22. Outlet portion 24 further comprises a centrally disposed, smaller diameter annular ring 70 which receives actuation member 58. Rings 68 and 70 are joined by radially extending ribs 72. Outlet portion 24 further comprises additional ribs 74 which together with ribs 72, support ribs 52, 54 and 56, as shown. It can thus be seen that outlets 32 for egress of air are defined by rings 56, 68 and by ribs 72, 74. Ring 70 is provided with an internally disposed, annular base 76 through which shaft 60 passes.

Inlet portion 22 comprises a portion 78 which forms a shoulder with a ring portion 80. End 48 of sleeve 46 is cemented to inlet portion 22 at the confluence of portions 78 and 80 thereof. Inlet portion 22 further comprises an exteriorly threaded portion 82 which is received within a correspondingly internally (female) threaded portion 84 of interior portion 18 to sandwich fabric 14 therebetween. Interior portion 18 and both inlet portion 22 and outlet portion 24 of exterior portion 16 are preferably made of 30% glass filled polybutylene terephthalate, for example, Valox 420 supplied by General Electric Company, which has a moisture absorption in twenty-four hours of 0.06%.

Valve seating manifold or disc 34 comprises rim 38 which provides sealing surface 36 against which diaphragm 42 seats. Disc 34 further comprises interior rings 86 and 88 which are supported by radially extending ribs 90 which support at their depending inner ends 92 an interior ring 94 which receives brass sleeve 67. Ribs 90 depend slightly centrally toward their ends 92, and the outer surfaces of rings 88 and 86 are generally parallel thereto, so as to make side 40 of disc 34 slightly concave when viewed in cross section. Additionally, sealing surface 36 on disc 34 is slightly concave, better to seat diaphragm 42 and improve its air sealability especially in the valve closed position. Disc 34 is preferably molded of nylon to provide sealing surface 36 with a smooth and shiny surface against which diaphragm 42 efficiently seals.

Diaphragm 42 is preferably molded of styrene ethylene butylene styrene compounded with silicone oil, a material whose surface smoothness compares microscopically with "Teflon" and silicone and whose elasticity is comparable to urethane. The material is capable of stretching without tearing. A suitable material is "C-Flex" sold by Concept Polymer, Clearwater, Fla.

Diaphragm 42 is provided with ribs 96 for strength. Diaphragm 42 further comprises a depending axially extending central portion 98 which is received within and cemented to the depending axially extending central portion 100 of disc 34 formed by the inner ends 92 of ribs 90 and interior ring 94. Cementing central portion 98 of diaphragm 42 to portion 100 of disc 34 prevents the diaphragm from ballooning which might be caused by an interior diving suit pressure greater than the pressure of the exterior water. Cementing also serves to maintain a radial tension on the diaphragm under such differential pressure.

Figure 5:
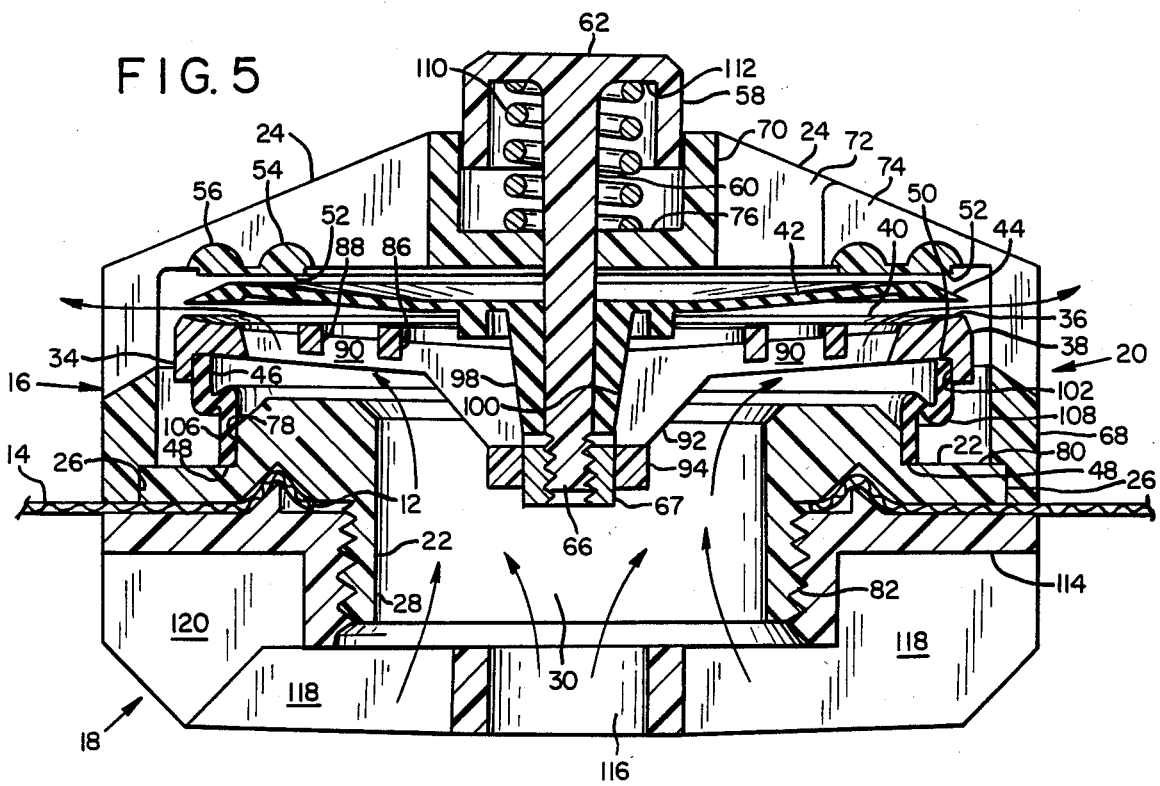
FIG. 5 is a view similar to FIG. 4 illustrating the valve in the open position.

End 48 of sleeve 46 is cemented to inlet portion 22 at portions 78 and 80 as above noted. End 50 of sleeve 46 is cemented to the interior surface 102 of rim 38 of disc 34. As shown in FIG. 4, sleeve 46 comprises a first portion 104 which is attached to disc 34 and a second portion 106 which is attached to inlet portion 22. The diameter of first portion 104 is greater than the diameter of second portion 106, whereby a conical intermediate portion 108 is formed therebetween. When sleeve 46 is compressed under pressure applied to disc 34, intermediate portion 108 folds as shown in FIG. 5.

Actuation member 58 comprises shaft portion 60 threadedly received in brass sleeve 67 in disc 34, and plunger 62 positioned exteriorly of the valve for manual actuation. A compression spring 110 is seated between the interior surface 112 of plunger 62 and base 76 in outlet portion 24. Spring 110 urges actuation member 58 away from housing 20, thereby to exert outward pressure on disc 34 to maintain rib 52 in contact with sealing rim portion 44 of diaphragm 42 and urge the same sealingly into engagement with surface 36 of disc 34.

The interior portion or base 18 of valve 10 is threadedly attached to portion 82 of inlet portion 22 as above described. Interior portion or base 18 comprises a ring 114 and an inlet 116 supported by radially extending ribs 118. Base 18 further comprises short exteriorly disposed ribs 120. Ribs 118 and 120 serve to prevent blockage of air through inlet 116 as might occur if the diver is wearing thick insulating underwear beneath fabric 14 of the diving suit. Ribs 118 and 120 are sufficiently deep to permit air freely to pass through the valve irrespective of the type of undergarment worn by the diver.

When the diver wishes to exhaust air from the interior of his suit, he presses plunger 62, thereby compress spring 110 and move disc 34 and diaphragm 42 away from rib 52. As long as the air inside the suit is at a greater pressure than the water exteriorly thereof, the interior air can flow radially between sealing rim portion 44 of diaphragm 42 and sealing surface 36 of disc 34 as shown by the arrows in FIG. 5, thereby to egress the valve. As soon as the interior air pressure is equal to that of the water exteriorly, sealing rim portion 44 of diaphragm 42 will again seal against surface 36 of disc 34, thereby to prevent water entering the suit.

The relatively large diameter of diaphragm 42 allows air egress from the valve under minimal pressure differential. Ribs 72 and 74 of outlet portion 24 create a very open structure. Ribs 118 and 120 of interior portion or base 18 do likewise. The result is that our valve is capable of venting several hundred cubic feet of air per minute under as little as three pounds per square inch of differential air pressure. An entire dry suit can be vented in a matter of seconds. The resulting valve is consequently a very safe exhaust valve. This is very important as safety is the number one consideration in the design of a diving suit.

Other embodiments and modifications of the subject invention may readily come to the mind of one skilled in the art having the benefit of the teachings presented in the foregoing description and drawings. It is, therefore, to be understood that this invention is not to be limited thereto, but that all such embodiments and modifications are intended to be included within the scope of the appended claims.

We claim:

1. An air outlet valve for diving apparatus comprising:
   a housing an inlet portion, an inlet disposed in the inlet portion, an outlet portion, an outlet disposed in the outlet portion, and a flow passage extending from the inlet portion to the outlet portion;
   a valve seating disc disposed interiorly of the housing intermediate the inlet portion and the outlet portion thereof, the disc being substantially planar and having first and second sides facing the outlet and inlet portions of the housing, respectively, the disc having a rim and an annular valve seat sealing surface adjacent the rim, the sealing surface being disposed on the first side of the seating disc, the disc including at least one fluid flow passage therethrough;
   a flexible diaphragm having an annular valve seat engaging sealing rim portion, the diaphragm being centrally secured to the seating disc with the sealing rim portion disposed adjacent the sealing surface of the disc;
   an axially resilient sleeve sealingly attached at its ends to the inlet portion of the housing and the seating disc, respectively, the sleeve being attached generally peripherally to the disc adjacent the rim of the disc, the sleeve being adapted to be compressed under pressure applied to the disc;
   annular contacting means disposed interiorly on the outlet portion of the housing and adapted to contact the sealing rim portion of the diaphragm; and
   an actuation member having a shaft portion, the shaft portion having inner and outer end portions, said shaft portion extending axially through the outlet portion of the housing, the actuation member further having an engageable exterior portion attached to the outer end portion of the shaft portion, the inner end portion of said shaft portion being attached centrally to the valve seating disc, the actuation member including compression spring means in contact with the outlet portion of the housing, the spring means urging the engageable exterior portion away from the housing so as to urge the annular valve seat sealing surface of the valve seating disc sealingly to engage the sealing rim portion of the diaphragm such that the diaphragm is urged to engage the annular contacting means, the actuation member being displaceable to compress the spring means and thereby the sleeve and move the disc away from the annular contacting means, whereby air under pressure can flow from the inlet, radially between the sealing rim portion of the diaphragm and the sealing surface of the disc, and out the outlet of the valve.

2. An air outlet valve as in claim 1, wherein the first side of the seating disc facing the outlet portion of the housing is concave.

3. An air outlet valve as in claim 2, wherein the annular sealing surface on the seating disc is concave.

4. An air outlet valve as in claim 1, wherein the valve seating disc has an axially extending central portion and the flexible valve diaphragm also includes an axially extending central portion, the axially extending central portion of the diaphragm being received within and attached to the axially extending central portion of the disc.

5. An air outlet valve as in claim 1, wherein the flexible diaphragm is provided with radially extending stiffening ribs.

6. An air outlet valve as in claim 1, wherein the axially resilient sleeve comprises a cylindrical member having a first portion attached to the seating disc, a second portion attached to the inlet portion of the housing, and an intermediate portion between the first and second portions, the first portion having a diameter greater than the diameter of the second portion, the sleeve folding in the intermediate portion under pressure applied to the disc.

7. An air outlet valve as in claim 1, wherein the annular contacting means on the outlet portion of the housing comprises an annular rib, the rib being adapted to contact the sealing rim portion of the diaphragm.

8. An air outlet valve as in claim 1, further comprising a base, the base being attached to the inlet portion of the housing, the base comprising an inlet and a plurality of ribs extending radially outwardly thereform, the inlet of the base communicating with the inlet in the inlet portion of the housing.

* * * * *